US008037199B2

(12) United States Patent
MacKay et al.

(10) Patent No.: US 8,037,199 B2
(45) Date of Patent: Oct. 11, 2011

(54) LOCALIZATION OF RESOURCES USED BY APPLICATIONS IN HAND-HELD ELECTRONIC DEVICES AND METHODS THEREOF

(75) Inventors: Jon MacKay, Kitchener (CA); Matthew Bells, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/542,940

(22) Filed: Aug. 18, 2009

(65) Prior Publication Data

US 2009/0307365 A1    Dec. 10, 2009

Related U.S. Application Data

(63) Continuation of application No. 10/797,421, filed on Mar. 10, 2004, now Pat. No. 7,590,748.

(60) Provisional application No. 60/453,510, filed on Mar. 12, 2003.

(30) Foreign Application Priority Data

Mar. 11, 2003    (CA) ...................................... 2421656

(51) Int. Cl.
*G06F 15/16* (2006.01)

(52) U.S. Cl. .......................... 709/230; 709/202; 709/246

(58) Field of Classification Search ........................ None
See application file for complete search history.

(56) References Cited

U.S. PATENT DOCUMENTS

| 5,148,367 | A   | * | 9/1992  | Saito et al. ..................... 715/210 |
|-----------|-----|---|---------|-------------------------------------------|
| 5,477,448 | A   |   | 12/1995 | Golding et al.                            |
| 6,345,244 | B1  | * | 2/2002  | Clark ................................. 704/2 |
| 7,260,628 | B2  |   | 8/2007  | Yamamoto et al.                           |
| 7,385,531 | B2  | * | 6/2008  | Zhang .............................. 341/28 |
| 2002/0087515 | A1 | * | 7/2002  | Swannack et al. ................. 707/2 |
| 2002/0162093 | A1 |   | 10/2002 | Zhou et al.                           |
| 2003/0046059 | A1 |   | 3/2003  | Litster et al.                        |
| 2003/0046526 | A1 |   | 3/2003  | Zhang et al.                          |
| 2003/0046527 | A1 |   | 3/2003  | Musuchenborn                          |
| 2003/0187681 | A1 | * | 10/2003 | Spain ............................... 705/1 |
| 2004/0015343 | A1 | * | 1/2004  | Nakayama ....................... 704/8 |

FOREIGN PATENT DOCUMENTS

SE    0002317    6/2000

OTHER PUBLICATIONS

CIPO: Office Action dated Jan. 4, 2005 in Canadian Application No. 2,421,656.
CIPO: Office Action dated Apr. 30, 2007 in Canadian Application No. 2,421,656.

* cited by examiner

*Primary Examiner* — John B. Walsh
(74) *Attorney, Agent, or Firm* — Jones Day

(57) ABSTRACT

A system and method are provided for localizing applications that are used with hand-held electronic devices.

8 Claims, 2 Drawing Sheets

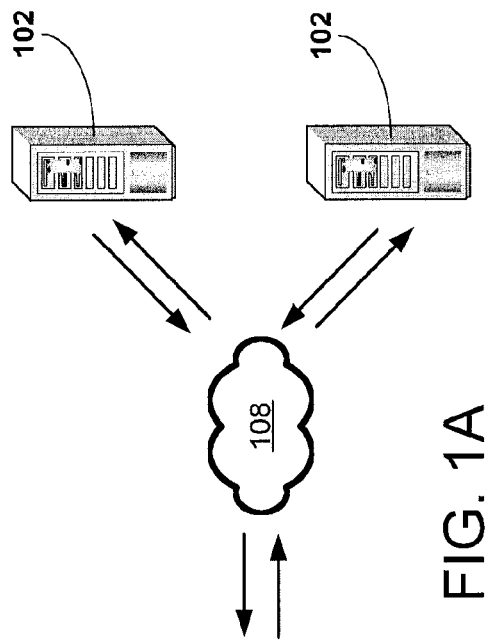
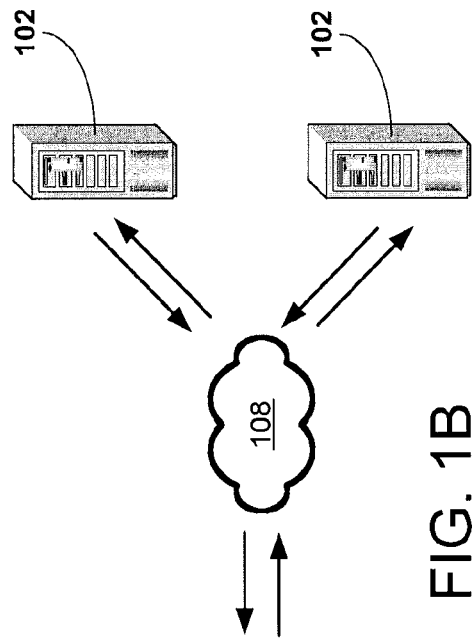
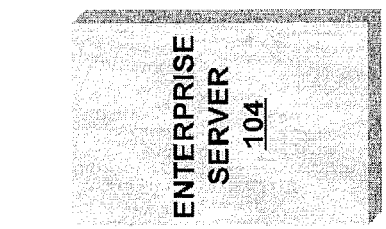
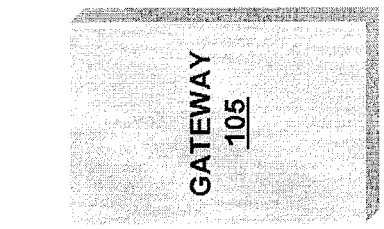
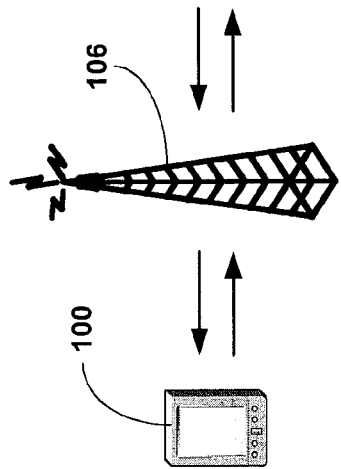
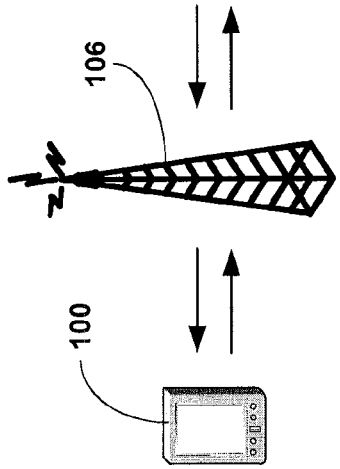
FIG. 1A
FIG. 1B

LOCALIZATION OF RESOURCES USED BY APPLICATIONS IN HAND-HELD ELECTRONIC DEVICES AND METHODS THEREOF

CROSS-REFERENCE TO RELATED APPLICATIONS

This application claims the benefit as a continuation of U.S. patent application Ser. No. 10/797,421 entitled "Localization Of Resources Used By Applications In Hand-Held Electronic Devices And Methods Thereof" and filed on Mar. 10, 2004, which in turn claims priority under 35 USC §120 of U.S. Provisional Application No. 60/453,510 entitled "Localization Of Resources Used By Applications In Hand-Held Electronic Devices And Methods Thereof," which was filed on Mar. 12, 2003, and claims the benefit under 35 USC §119 of Canadian Patent Application No. 2,421,656 entitled "Localization Of Resources Used By Applications In Hand-Held Electronic Devices And Methods Thereof," which was filed on Mar. 11, 2003. This application incorporates each of these prior applications into the present application by reference.

BACKGROUND

1. Field

The systems and methods described in this patent document relate generally to wireless communication and more specifically to wireless communication with mobile stations.

2. Description of the Related Art

Hand-held electronic devices typically have software applications installed on them. Many software applications can be localized for a specific location. For example, a personal information manager application may have an English language user interface for use in English speaking countries such as the U.S. and a French language user interface for use in French speaking countries such as Canada.

SUMMARY

A system and method are provided for localizing applications that are used with hand-held electronic devices.

BRIEF DESCRIPTION OF THE DRAWINGS

FIGS. 1A and 1B are block diagrams of exemplary network communication systems;

Figure 2:
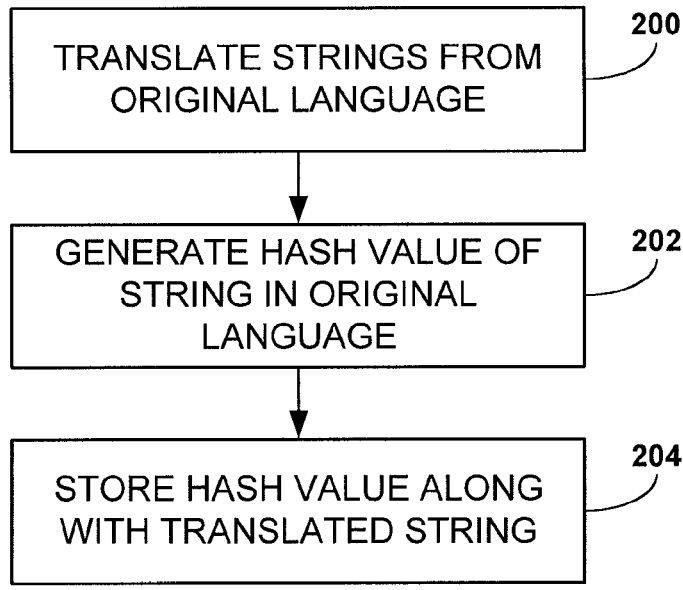
FIG. 2 is a flowchart of an exemplary method for generating and storing information relating to an original language string that may be translated into another language for localization purposes.

For simplicity and clarity of illustration, elements shown in the figures are not drawn to scale. Also, reference numerals that appear in multiple figures indicate that the exemplary systems illustrated in the figures may have corresponding or analogous elements.

DETAILED DESCRIPTION

Shown in FIGS. 1A and 1B are diagrams of exemplary network communication systems. The system shown in FIG. 1A comprises a hand-held electronic device 100, one or more origin servers 102, and an enterprise server 104. The hand-held electronic device 100 is coupled to the enterprise server 104 via a wireless network 106. The Enterprise server 104 is coupled to an origin server 102 via a local-area-network or wide-area-network 108, such as, but not limited to, an Intranet or the Internet.

The system shown in FIG. 1B comprises a hand-held electronic device 100, one or more origin servers 102, and a gateway 105. The Gateway 105 in this example is a direct Transmission Control Protocol (TCP) gateway or a Wireless Application Protocol (WAP) gateway, but could be some other type of gateway. The hand-held electronic device 100 is coupled to the gateway 105 via a wireless network 106. The Gateway 105 is coupled to an origin server 102 via a wide-area-network 108, such as, but not limited to, the Internet.

The hand-held electronic device 100 may be a personal data assistant (PDA), a personal information manager (PIM), a two-way pager, and the like. The hand-held electronic device 100 preferably has an operating system, a user-interface engine, and one or more specialized software applications, but other architectural configurations are possible.

The software applications preferably have user-interface capabilities that are implemented via a user-interface engine and that may be adaptable to specific locales. For example, the language of the user interface and the formatting of numbers, data, currency and percents may be locale-specific. In another example, the upper and lower casing of letters may be locale-specific. In a further example, the way a list is sorted or which day is the one in the left column of a calendar may be locale-specific.

Resource bundles are a convenient way to provide locale-specific resources for use by a software application. Resource bundles may comprise, for example, translated strings and formatting information. Resource bundles may also comprise any or all of images, string arrays, and lists of strings. For example, a list of strings may be defined as follows:

SAVE#0="Save";
CANCEL#0="Cancel";
DISCARD#0="Discard";

while an exemplary array of strings may be defined as follows:

```
CLOSE_OPTIONS#0={
    "Save",
        "Cancel",
        "Discard",
    };
```

When an application is installed on the hand-held electronic device 100, a default resource bundle and possibly some other resource bundles may be installed along with it. However, due to the limited storage and memory of hand-held electronic device 100, generally not all available resource bundles are installed for all applications on the device.

An origin server 102 may store resource bundles for various applications and various locales. For example, each resource bundle may be located by a universal resource locator (URL) of the form:

"protocol://address/vendor/product/version/locale.resource"

For example, the origin server 102 may store the following resource bundles:

http://languages.rim.net/rim/BlackBerryApps/3.6.0/en_CA.rb http://languages.rim.net/rim/BlackBerryApps/3.6.0/fr_CA.rb http://languages.rim.net/rim/BlackBerryApps/3.6.0/en_US.rb
http://languages.rim.net/rim/BlackBerryApps/3.6.0/es_US.rb
http://languages.rim.net/rim/BlackBerryBrowser/3.6.0/en_CA.rb
http://languages.rim.net/rim/BlackBerryBrowser/3.6.0/fr_CA.rb
http://languages.rim.net/rim/BlackBerryBrowser/3.6.0/en_US.rb where, in this example, the protocol is "http" (although any other suitable protocol may be used), the address is "languages.rim.net", which is an example of the address of origin server 102, the vendor is "rim", the version is "3.6.0", and the locales are, in this example, as specified by Java convention. Resource bundles from different vendors may be stored on the same server.

The resource bundles may take any suitable form. For example, the resource bundles may be in the form of an uncompressed text file, or in the form of a compressed binary object, where any suitable compression algorithm or algorithms have been applied. Compressed resource bundles will require less download time for a given bandwidth than uncompressed resource bundles.

Each application for which locale-specific resource bundles are stored may contain a configuration string that indicates where the resource bundles may be found. For example, resource bundles for third-party applications may be stored on a server operated by the third party or, as described above, on a server along with applications from other parties.

If a user of a hand-held electronic device 100 wants to operate a particular application in a locale-specific manner for a particular locale and the appropriate resource bundle is not currently installed on the device, the user may instruct the hand-held electronic device 100 to download the desired resource bundle over the wireless network 106. The user has the option of selecting a particular locale, and the hand-held electronic device 100 will automatically download resource bundles for that locale for each application installed on the device 100, if available. The user has a number of options available for viewing resource bundles. For example, the user may view all available resource bundles by having the device 100 access the URL "protocol://address/", or all available resource bundles for a particular application by having the device 100 access the URL "protocol://address/vendor/product/", or all available resource bundles for a particular version of a particular application, by having the device 100 access the URL "protocol://address/vendor/product/version/".

Similarly, fonts to properly display the language (e.g. currency symbols) or other locale-specific resources used in a resource bundle may be downloaded by the device 100 over the wireless network 106 from a server.

The ability to selectively and dynamically download resource bundles for applications over a wireless network can serve many purposes. For example, a Canadian resident user may travel to Switzerland for a short business trip, taking her hand-held electronic device along with her. Resource bundles for the locales en_CA and/or fr_CA may already be stored on the device, with one of the resource bundles serving as the default. While in Switzerland, she may wish to enable a German speaker to use the hand-held electronic device. She may download the resource bundles for the locale de_CH, which corresponds to the German language in Switzerland, for one or more applications installed on the device. The resource bundles will be downloaded over a wireless network, so that the user is not required to download the resource bundles to a computer and then sync the hand-held electronic device to the computer. Once her business trip is completed, the user may delete the resource bundles for the locale de_CH from her device to free up device storage and memory.

Resource bundles may be grouped into families according to their application. If a resource bundle family for a particular application is installed on a hand-held electronic device 100, the application may switch between resource bundles without having to load new resource bundles. One way of implementing this is to have the application make its entire resource bundle family available for use and access the appropriate reference bundle from within the family on-the-fly by selecting for use the resource bundle for the current locale that is selected by the user. For example, an application's user-interface components may have as inputs for selecting a localized string both a resource bundle family identifier and an identifier for the specific string within the resource family bundle to be accessed. The application will choose the specific string by choosing the string that corresponds to the user selected current locale. Thus, the applications are not required to monitor for an event that indicates a current locale change, but, instead the application changes when the user signals to the application that the current locale has changed. Consequently, when the locale changes, the application will start displaying information in a manner appropriate for the new locale, without requiring the application to restart.

The hand-held electronic device 100 may store resource bundles or a resource bundle family comprising locale-specific translations of common user-interface resources. For example, translations of common user interface resources such as "Open", "Close", "OK", "Cancel", may be stored. This can be helpful when a current local resource bundle is not available for use with an application. In this situation, the application can automatically replace the common user-interface resources with the local specific translations of the common user-interface resources in the appropriate resource bundle. This allows at least a portion of the application's user-interface resources to appear in the appropriate language for the current locale.

As compared to Java which encodes a locale as an object with 3 strings and that consumes at least 132 bytes of storage and may result in slow comparisons, the language and country of a locale can be encoded together as a 4-byte integer. The variant may also be encoded as a 4-byte integer as well, so that a single locale may require no more than 8 bytes for storage. This allows a processor of the hand-held device 100 to perform a comparison using an int or long comparison instruction. In addition, mapping each byte onto an ASCII value may enhance debugging.

The hand-held electronic device 100 may also comprise an AutoText engine, which is a software application that extends the user interface by making use of one or more databases to perform text insertions and other related activities. In addition to a standard AutoText database comprising entries of "original string" and associated "replacement strings" pairs, an additional database comprising locale-specific entries could be stored on the hand-held electronic device 100. A user of the hand-held electronic device 100 may subscribe to a number of databases whose changes could be pushed to the device over wireless network 106.

For example, a health professional may subscribe to a database whose entries include, for example, some or all of the following pairs: ("cpe", "complete physical examination"); ("bp", "blood pressure"); ("cv", "cardiovascular"); ("fh", "family history"); ("infln", "inflammation"); etc. In another example, a legal professional may subscribe to a database whose entries include, for example, some or all of the following pairs: ("cpas", "contract of purchase and sale"); ("def", "defendant"); ("pla", "plaintiff"); ("sol", "solicitor"); ("priv", "privileged"); etc. Similarly, a company whose employees use hand-held electronic devices such as hand-held electronic device 100 may provide a database to employees whose entries include shortcuts of terminology related to the company's business. Changes to the company-specific database could be pushed to the devices over wireless network 106. For example, a database for Research In Motion employees may include some or all of the following pairs: ("bb", "BlackBerry"); ("cdma", "CDMA"); ("rim", "RIM"); ("rimo", "Research In Motion"); etc.

Since a locale can indicate not only a country and a language, but also a variant, a locale may be used to indicate the profession or industry or company to which the user belongs, thus identifying which databases are of interest.

The AutoText engine, or alternatively a separate software application, may be able to implement an AutoArticle functionality. The user of a hand-held electronic device 100 may enter a special character sequence (defined on a per-language basis) that triggers a dictionary and/or grammar lookup to determine whether a word of interest is masculine, feminine, plural, etc. This feature may be useful, for example, in a language such as French, Italian, or Danish.

In an auto-correct mode, articles may be inserted or corrected automatically as they are entered by the user. The user may use a special character sequence (defined on a per-language basis) to indicate that the article should be automatically inserted. For example, "ll lune" would become "la lune" while "ll soleil" would become "le soleil". "ll bureaux" would become "les bureaux", and "uu bureau" would become "un bureau". Alternatively, instead of having the user enter a special character sequence, in auto-correct mode an incorrect article would be automatically corrected. For example, "le lune" would be automatically corrected to "la lune". If the AutoText engine were unable to determine the article of a word, a dialog box may appear to enable the user to choose the article to use.

The AutoText engine, or alternatively a separate software application, may be able to implement an AutoQuote functionality. For example, a user of hand-held electronic device 100 may enter a quote character. If the quote character is preceded by an empty or whitespace, then the quote character would be replaced with an open-quote character. Otherwise, the quote character would be replaced with a close-quote character. The open-quote character and close-quote character may be locale-specific. For example, when the current locale of the hand-held electronic device 100 includes the French language, the open- and close-quote characters may be guimets ((<< and >>), respectively). In another example, when the current locale of the hand-held electronic device 100 includes the German language, the open- and close-quote characters may be guimets, or the open-quote character may be a lower quote (") and the close-quote character may be an upper quote (").

To facilitate the localization of applications developed for electronic devices, such as the hand-held electronic device 100, certain features may be incorporated into a development environment. One such feature is a system for determining whether a specific translation of a user-interface components is the translation for the most recent version of the user-interface components or a translation of an earlier version. This system can be implemented by including in the original language string's additional related information.

FIG. 2 is a flowchart of an exemplary method for generating and storing this additional information. One or more strings in an original language may be translated into a different language (Step 200). A code such as a hash value may be generated for each string in the original language by using a coding method such as the hash code method (Step 202). The code value may be stored along with the translated string (Step 204). The code value for a particular input should be statistically unique as it is with a hash value for a particular input.

Figure 3:
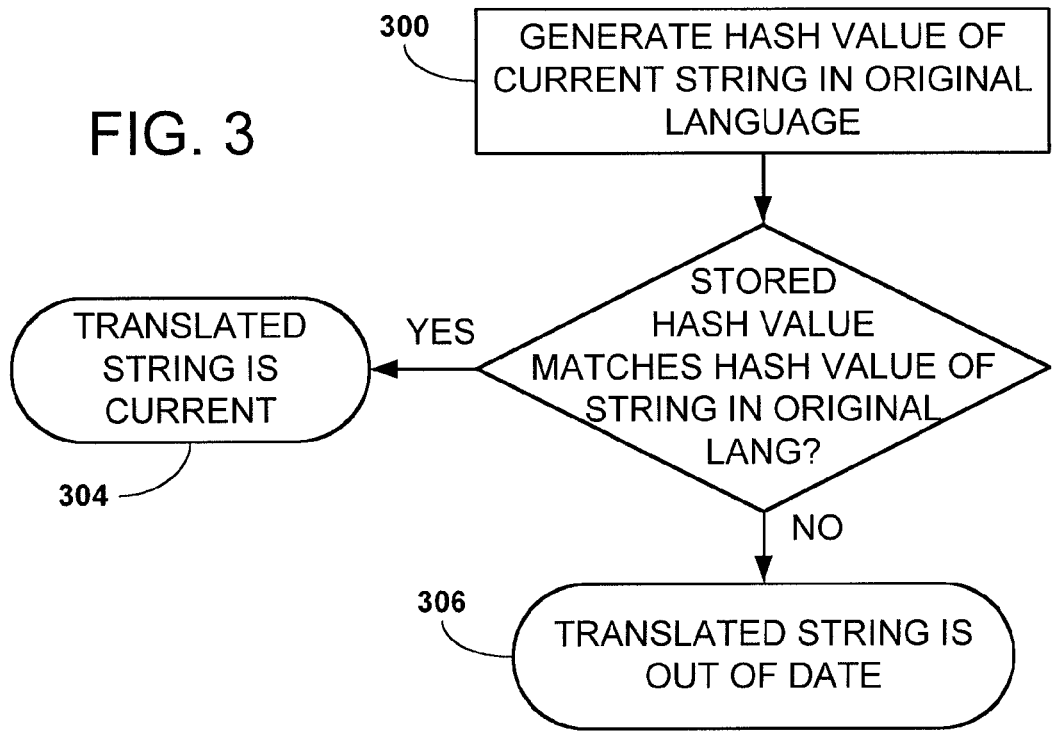
FIG. 3 is a flowchart of an exemplary method for determining whether a translated string is out of date.

During development of an application, a string in an original language may be changed after having been translated. FIG. 3 is a flowchart of an exemplary method for determining whether a translation of a string is out of date. A code such as a hash value of the current string in the original language may be generated using the same coding method described above (Step 300). This newly generated code may be compared to the code stored with the translated string (Step 302). If the codes match, then in all likelihood, the string in the original language has not changed since the translation was done, and the translated string is current (Step 304). If the codes do not match, then the translated string is out of date (Step 306). A viewer or editor application in the development environment may then visually indicate which information is current and which is not.

Another feature that may be incorporated into the development environment is a system for providing a resource bundle diagnostic tool. An exemplary system may include a resource bundle that may be defined using at least two separate files: a resource header file, that lists keys for each localized resource in the resource bundle, and a resource content file, that lists the keys and their localized resource values. A resource bundle diagnostic tool in the exemplary system may perform any or all of the following operations:

I. Validation Operations a) checking for missing resources, by identifying keys listed in the resource header file that have no corresponding entry in the corresponding resource content file;

b) checking for empty resources, by identifying keys listed in the resource header whose corresponding entry in the corresponding resource content file has no localized resource value defined;

c) checking for undeclared resources, by identifying resources listed in the resource content file but whose key has not been listed in the resource header file;

d) checking for out-of-date resources as described above;

e) verifying that the original resource value and the localized resource value have the same format, for example, "name:" has been translated to "nom:", and the space after the colon has been included in the translated string;

f) checking that the display width of the resources (which may depend upon the widths of characters in a particular font) do not exceed the predefined display width of the screen of the hand-held electronic device;

g) validating hotkeys (used to quickly access different applications on the hand-held electronic device) to ensure that in a particular locale, the same hotkey is not assigned to more than one function, and to ensure that the hotkey is an allowed length;

II. Statistical operations—generating statistics for the number of new resources present, which may, for example, be used by the developer to gauge how much work still needs to be done; and III. Searching for unused resources—identifying resources listed in the resource header file and resource content file, but not called by the application.

Software development is often tracked using a source code control system. As developers write software code, various branches are made for different releases to customers, so that developers can write new, untested code at the same time that a branch is being tested and stabilized for release. Since different branches of software code may have many resources in common, it is generally not feasible for the resources of each branch to be translated separately.

Another feature that may be incorporated into the development environment is a system having a resource "database" tool. For example, the tool may generate from resource files of a particular branch of code of a software application a resource "database". The "database", which may be a flat file or any other format for storing the information, may contain an identifier of a resource, for example, CLOSE#0, its value in various locales, for example, "Close" in the locale "en", "Ferme" in the locale "fr", the hash value of the resource value in its original language, as described herein above, and the name of the resource file(s) for these resources. Optionally, other information may be included in the "database", and/or not all of the above-listed information may be included in the "database".

The tool may enable a software developer or integrator to copy the resource "database" to another branch of code of the software application. If this other branch of the software application does not yet comprise localized resource files, the tool may then enable the creation of localized resource files comprising the resources whose information is stored in the copied resource "database". The validation tools described herein above may then be used to determine whether translations of resources appearing in this branch are up to date or missing. Only those localized resources which are missing or out of date will then be marked for translation, rather than requiring all the resources for this branch to be translated.

Alternatively, this branch of the software application may already comprise resource files, and the tool may use the copied resource "database" to update translated resources when the hash value in the copied resource "database" does not match the hash value in this branch's resource files, and to complete missing resource values in this branch's resource files. Only those localized resources which are still missing or still out of date will then be marked for translation, rather than requiring all the resources for this branch to be translated.

The format of resources in a resource bundle may enable strings to display one of a predefined set of string options by matching the options with attributes in a text. This type of format may have several uses, only one of which will be described here for clarity. Moreover, although only one type of format is shown in the following examples, alternate formats that enable strings to display one of a predefined set of string options by matching the options with attributes in text may be used instead.

For example, the format may be used to match gender. The phrase "Repeats every {0}", where {0} is replaced with either "week" or "month" will be translated in French to "Répète toutes les semaines" or "Répète tous les mois". Depending on the gender of the insertion, the second word of the French phrase is different. For example, the translated phrase may use the following format:

"Répète {0,choiceattrib,m#tous|f#toutes}les {0}"

thus associating "tous" with the attribute "m" and "toutes" with the attribute "f", and the insertions may be "semaines\0f" and "mois\0m", thus giving "semaines" the attribute "f" and giving "mois" the attribute "m". Then the user interface of the hand-held electronic device may be extended to test the insertions for the attribute and to select the string associated with the attribute of the insertion.

The structural arrangements and steps described herein and shown in the drawings are examples of structures, systems, or methods having elements or steps corresponding to the elements or steps of the invention recited in the claims. This written description and drawings may enable those skilled in the art to make and use embodiments having alternative elements or steps that likewise correspond to the elements or steps of the invention recited in the claims. The intended scope of the invention thus includes other structures, systems, or methods that do not differ from the literal language of the claims, and further includes other structures, systems, or methods with insubstantial differences from the literal language of the claims.

We claim:

1. A method of operation for a hand-held electronic device whose operation in some circumstances is based on its current locale, the method comprising:
   when a first locale is a current locale of said hand-held electronic device, automatically replacing a quote character entered by a user of a hand-held electronic device that is preceded by an empty or white space with a first open-quote character for said first locale; and
   when a second locale different from said first locale is the current locale of said hand-held electronic device, automatically replacing a quote character entered by a user of said hand-held electronic device that is preceded by an empty or white space with a second open-quote character for said second locale that is different from said first open-quote character.

2. A computer-implemented method for developing resources for use with a software application for hand-held devices, the method comprising:
   generating localized resource information for a software application;
   listing in a first file keys for the localized resource information;
   listing in a second file the keys and localized resource values associated with the keys;
   associating the first file with the second file; and
   validating the localized resource information by checking, using one or more data processors executing software instructions, the two files for missing resources.

3. A computer-implemented method for developing resources for use with a software application for hand-held devices, the method comprising:
   generating localized resource information for a software application;
   listing in a first file keys for the localized resource information;
   listing in a second file the keys and localized resource values associated with the keys;
   associating the first file with the second file; and
   validating the localized resource information by checking, using one or more data processors executing software instructions, the two files for empty resources.

4. A computer-implemented method for developing resources for use with a software application for hand-held devices, the method comprising:
   generating localized resource information for a software application;
   listing in a first file keys for the localized resource information;
   listing in a second file the keys and localized resource values associated with the keys;
   associating the first file with the second file; and
   validating the localized resource information by checking, using one or more data processors executing software instructions, the two files for undeclared resources.

5. A computer-implemented method for developing resources for use with a software application for hand-held devices, the method comprising:

generating localized resource information for a software application;

listing in a first file keys for the localized resource information;

listing in a second file the keys and localized resource values associated with the keys;

associating the first file with the second file; and validating the localized resource information by checking, using one or more data processors executing software instructions, for resources that need an updated translation.

6. A computer-implemented method for developing resources for use with a software application for hand-held devices, the method comprising:

generating localized resource information for a software application;

listing in a first file keys for the localized resource information;

listing in a second file the keys and localized resource values associated with the keys;

associating the first file with the second file; and validating the localized resource information by determining, using one or more data processors executing software instructions, whether an original resource value and a corresponding localized resource value have the same format.

7. A computer-implemented method for developing resources for use with a software application for hand-held devices, the method comprising:

generating localized resource information for a software application;

listing in a first file keys for the localized resource information;

listing in a second file the keys and localized resource values associated with the keys;

associating the first file with the second file; and validating the localized resource information by determining whether a display width of a resource exceeds a predefined display width of a screen of the hand-held electronic device.

8. A computer-implemented method for developing resources for use with a software application for hand-held devices, the method comprising:

generating localized resource information for a software application;

listing in a first file keys for the localized resource information;

listing in a second file the keys and localized resource values associated with the keys;

associating the first file with the second file; and validating the localized resource information by determining whether, in a particular locale, a hotkey for a software application of the hand-held electronic device is assigned to more than one function.

* * * * *